US010108898B1

(12) United States Patent
Ballam et al.

(10) Patent No.: US 10,108,898 B1
(45) Date of Patent: Oct. 23, 2018

(54) PACKAGE TRACKING LABEL HAVING ACTIVATION AND DEACTIVATION TABS

(71) Applicant: QUALCOMM Incorporated, San Diego, CA (US)

(72) Inventors: Robert Scott Ballam, Eatons Hill (AU); Robert Ganton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/839,847

(22) Filed: Dec. 12, 2017

Related U.S. Application Data

(60) Provisional application No. 62/558,843, filed on Sep. 14, 2017.

(51) Int. Cl.
*G06K 19/077* (2006.01)
*G08B 13/24* (2006.01)
*G06Q 10/08* (2012.01)
*G06K 19/073* (2006.01)

(52) U.S. Cl.
CPC . *G06K 19/07722* (2013.01); *G06K 19/07345* (2013.01); *G06K 19/07773* (2013.01); *G06K 19/07798* (2013.01); *G06Q 10/0833* (2013.01); *G08B 13/242* (2013.01)

(58) Field of Classification Search
CPC ....... G06K 19/07345; G06K 19/07798; G08B 13/2417; G08B 13/242
See application file for complete search history.

(56) References Cited

U.S. PATENT DOCUMENTS

| 6,465,880 | B1 * | 10/2002 | Dobashi ........... G06K 19/07726 257/679 |
|---|---|---|---|
| 7,215,976 | B2 | 5/2007 | Brideglall |
| 7,893,839 | B2 | 2/2011 | Kessler |
| 9,471,817 | B1 * | 10/2016 | Alhazme .......... G06K 19/07345 |
| 9,754,137 | B2 | 9/2017 | Debates et al. |
| 2013/0021215 | A1 | 1/2013 | Suzuki et al. |
| 2016/0371517 | A1 * | 12/2016 | Debates ........... G06K 19/07309 |
| 2017/0229000 | A1 | 8/2017 | Law |
| 2018/0025603 | A1 * | 1/2018 | Tyler .................. G08B 13/2462 |

* cited by examiner

*Primary Examiner* — Suezu Ellis
(74) *Attorney, Agent, or Firm* — Muncy, Geissler, Olds & Lowe, P.C./QUALCOMM

(57) ABSTRACT

A method of tracking a package. The method includes applying a package label to a package in which the package label comprises an antenna circuit, an activation tab configured to activate the antenna circuit, and a deactivation tab configured to deactivate the antenna circuit. The method also includes activating the antenna circuit by removing the activation tab and periodically transmitting a signal by the antenna circuit upon activation. The signal comprises information that identifies the package. The method also includes receiving the signal and using the information in the signal to track a location of the package.

28 Claims, 7 Drawing Sheets

PACKAGE TRACKING LABEL HAVING ACTIVATION AND DEACTIVATION TABS

CROSS-REFERENCE TO RELATED APPLICATIONS

The present Application for Patent claims the benefit of U.S. Provisional Application No. 62/558,843, entitled "PACKAGE TRACKING LABEL", filed Sep. 14, 2017, assigned to the assignee hereof, and expressly incorporated herein by reference in its entirety.

FIELD OF DISCLOSURE

This disclosure relates generally to package tracking, and more specifically, but not exclusively, to package tracking using a single use label.

BACKGROUND

Package delivery has always been an important part of commerce, and the ability to identify a package and its location may be considered core to companies that ship packages from one location to another. For example, tracking packages is important to organizations of all kinds, whether it be a company keeping track of inventory to be sold in its stores, or a package delivery provider keeping track of packages being transported through its delivery network. To provide quality service, an organization typically creates and maintains a highly organized network for tracking its items—packages, people, objects, etc.

Conventionally, this tracking function may be provided by a variety of known mechanisms and systems. Machine-readable barcodes are one way organizations keep track of items. A retailer, for example, may use bar codes on items in its inventory. For example, items to be sold in a retailer's store may each be labeled with a different machine-readable bar code. In order to keep track of inventory, the retailer typically scans or otherwise captures an image of the bar code on each item so that a back-end part of the retailer's operation can keep track of what is coming in and leaving their possession from suppliers. In addition, when an item is sold to a consumer, the bar code for that item is scanned or captured to track sales and inventory levels.

Similarly, a package delivery provider may utilize machine-readable bar codes by associating a bar code with packages to be delivered to a recipient. For example, a package may have a bar code corresponding to a tracking number for that package. Each time the package goes through a transit checkpoint (e.g., the courier taking initial control of the package, the package being temporarily placed in a storage facility while being moved from a pickup point to a delivery location, and the package being delivered to the recipient, etc.), the package's bar code may be scanned. Bar codes, however, have the disadvantage that personnel must manually scan each bar code on each item in order to effectively track the items.

Thus, there remains a need for an improved system that may provide more robust identification and tracking of packages and do so in a cost effective manner. Accordingly, there is a need for systems, apparatus, and methods that overcome the deficiencies of conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a package tracking label comprises: an adhesive layer; a removable cover on a first side of the adhesive layer; a substrate on a second side of the adhesive layer opposite the first side of the adhesive layer; an antenna circuit on the substrate; a mold layer on the substrate configured to encapsulate the antenna circuit; an activation tab on the substrate configured to activate the antenna circuit upon removal; and a deactivation tab on the substrate configured to deactivate the antenna circuit upon removal.

In another aspect, a package tracking label, comprises: an adhesive layer; a removable cover on a first side of the adhesive layer; a substrate on a second side of the adhesive layer opposite the first side of the adhesive layer; means for transmitting a signal on the substrate; a mold layer on the substrate configured to encapsulate the means for transmitting the signal; means for activation on the substrate configured to activate the means for transmitting the signal upon removal; and means for deactivation on the substrate configured to deactivate the means for transmitting the signal upon removal.

In still another aspect, a method of tracking a package, comprises: applying a package label to a package, the package label comprises an antenna circuit, an activation tab configured to activate the antenna circuit, and a deactivation tab configured to deactivate the antenna circuit; activating the antenna circuit by removing the activation tab; periodically transmitting a signal by the antenna circuit upon activation, the signal comprises information that identifies the package; receiving the signal and using the information in the signal to track a location of the package; and deactivating the antenna circuit by removing the deactivation tab.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
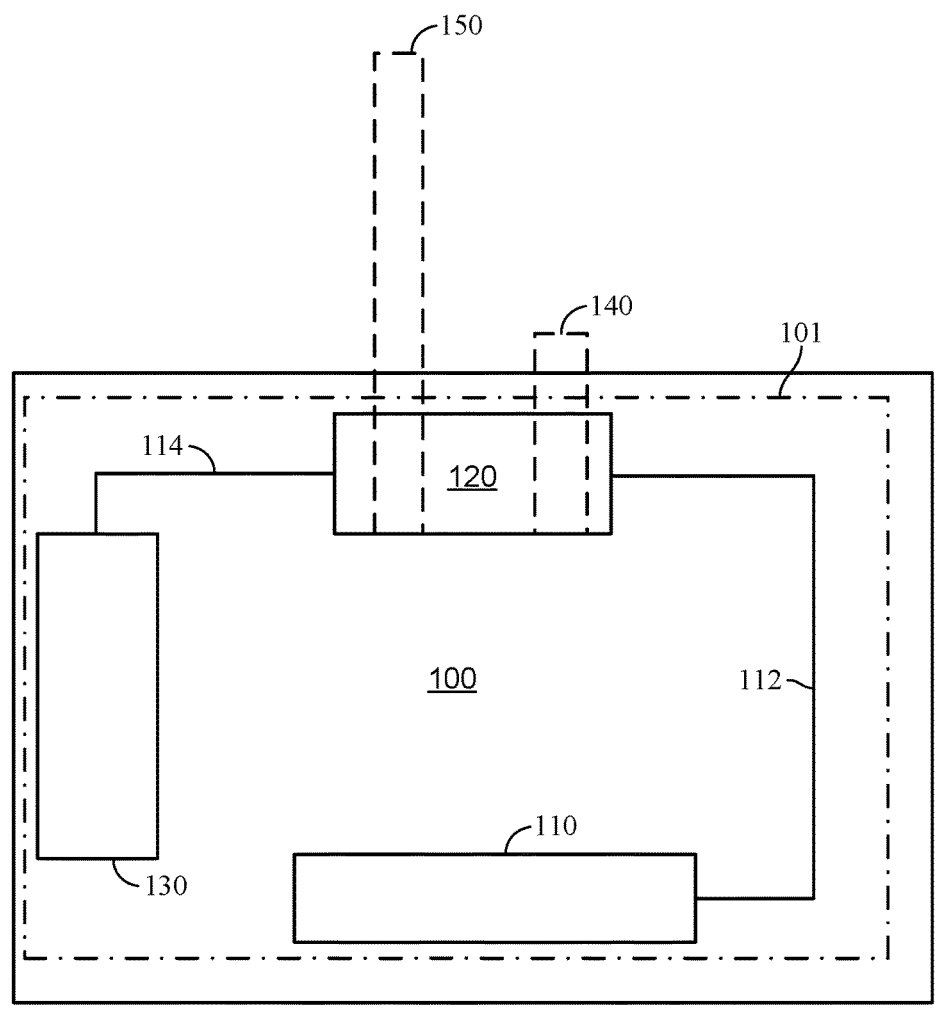
FIG. 1 illustrates a top down view of an exemplary package tracking label in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. For example, a package tracking label may include a Bluetooth Low Energy antenna circuit designed to activate when a label is applied to a package and deactivate when the package is opened signaling an end of life for the package tracking label. By activating the antenna circuit, the label may broadcast information about the identity of the package, such as the information that may be read from a bar code label used in the package delivery industry. However, the use of a periodically broadcasting packaging label may decrease the cost associated with tracking packages by avoiding the cost and resource consumption associated with a user scanning the bar code labels manually to obtain package information. In addition, the package tracking label requires no more interaction from the user than applying a standard label.

FIG. 1 illustrates a top down view of an exemplary package tracking label in accordance with some examples of the disclosure. As shown in FIG. 1, a package tracking label 100 may include an antenna circuit 101 that comprises a battery 110, a microprocessor 120 coupled to the battery 110 through a first routing 112 (e.g., conductive traces), and an antenna 130 coupled to the microprocessor 120 through a second routing 114 (e.g., conductive traces). The package tracking label 100 may also include an activation tab 140 and a deactivation tab 150. The activation tab 140 is configured to activate the microprocessor 120 when removed. The removal of the activation tab 140 may occur by manually removing the activation tab 140 directly or by removal of a removable cover 190 (See FIG. 2) attached to a bottom of the package tracking label 100. For example, when the removable cover 190 and the activation tab 140 are connected together such that removal of the removable cover 190 necessarily removes the activation tab 140 from the package tracking label 100. The deactivation tab 150 is configured to deactivate the microprocessor 120 when removed. The removal of the deactivation tab 150 may occur by manually removing the deactivation tab 150 directly (such as when the package is delivered) or by opening the package 195 (See FIG. 3) with the package tracking label 100 affixed. For example, when the package 195 having the package tracking label 100 is opened, the deactivation tab 150 is torn or separated from the package tracking label 100. This may be accomplished by placing the package tracking label 100 on the package 195 such that the deactivation tab 150 is located over the opening strip 196 (See FIG. 3) of the package 195 and is torn or removed from the package tracking label 100 during tearing or removing the opening strip 196 of the package 195.

The activation and deactivation of microprocessor 120 by activation tab 140 and deactivation tab 150, respectively, may be accomplished in various ways. For example, activation tab 140 may be magnetically coupled to a general purpose input output (GPIO) pin (not shown) of the microprocessor 120 such that the GPIO pin is configured to connect the microprocessor 120 to the battery 110 upon removal of the activation tab 140 (or connect the microprocessor to the antenna 130) (i.e., change the state of the GPIO pin and activate the microprocessor 120). Alternatively, the activation tab 140 may be connected to a trace on the substrate 160 that activates the antenna circuit 101 when the trace is broken by removal of the activation tab 140 (See FIGS. 5A-C, for example). Alternatively, the activation tab 140 may be situated over a magnetic switch (not shown) in the first routing 112 or the second routing 114 (when connecting the microprocessor 120 to the antenna 130) such that removal of the activation tab 140 may activate (close) the magnetic switch and couple the microprocessor 120 to the battery 110 (or connecting the microprocessor 120 to the antenna 130). Similarly, deactivation tab 150 may be magnetically coupled to a different or the same GPIO pin (not shown) of the microprocessor 120 such that the GPIO pin is configured to disconnect the microprocessor 120 from the battery 110 upon removal of the deactivation tab 150 (or disconnect the antenna 130 from the microprocessor 120) (i.e., change the state of the GPIO pin and deactivate the microprocessor 120). Alternatively, the deactivation tab 150 may be connected to a trace on the substrate 160 that deactivates the antenna circuit 101 when the trace is broken by removal of the deactivation tab 150 (See FIGS. 5A-C, for example). Alternatively, the deactivation tab 150 may be situated over a magnetic switch (not shown) in the first routing 112 or the second routing 114 (when disconnecting the microprocessor 120 from the antenna 130) such that removal of the deactivation tab 150 may deactivate (open) the magnetic switch and de-couple the microprocessor 120 from the battery 110 (or disconnecting the microprocessor 120 from the antenna 130).

The antenna 130 and microprocessor 120 may be a Bluetooth Low Energy based microprocessor and antenna configured to transmit and receive Bluetooth signals. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The battery 110, the microprocessor 120, the antenna 130, the first routing 112, the second routing 114, the activation tab 140, and the deactivation tab 150 may be a screen printed circuit formed using well known screen printing processes or could also use more standard flex circuit techniques.

Figure 2:
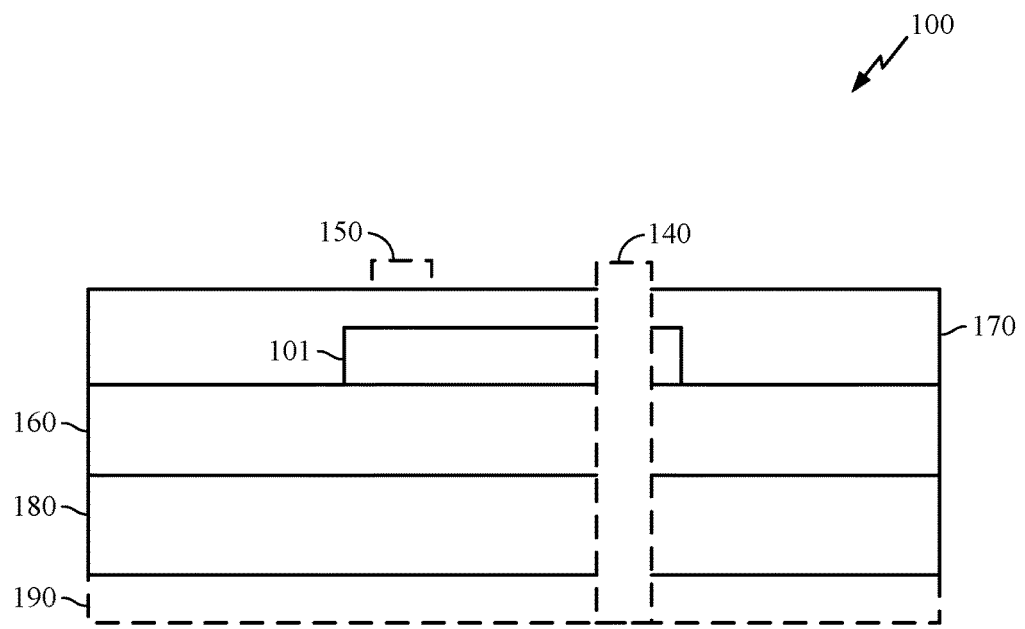
FIG. 2 illustrates a side view of an exemplary package tracking label in accordance with some examples of the disclosure.

FIG. 2 illustrates a side view of an exemplary package tracking label in accordance with some examples of the disclosure. As shown in FIG. 2, the package tracking label 100 may include an adhesive layer 180, a removable cover 190 on a first side of the adhesive layer 180, a substrate 160 on a second side of the adhesive layer 180, an antenna circuit 101 (e.g., battery 110, first routing 112, microprocessor 120, second routing 114, antenna 130, activation tab 140, and deactivation tab 150) on substrate 160, and a mold layer 170 that at least partially encapsulates the antenna circuit 101 to protect the antenna circuit 101. The activation tab 140 may be connected to the removable cover 190 by extending from the mold layer 170 along the side of the package tracking label 100 to the removable cover 190. The removable cover 190 is designed to be peeled off the adhesive layer 180 pulling (or tearing in some examples) the activation tab 140 off the package tracking label 100. The adhesive layer 180 is designed to affix the package tracking label 100 to a package 195 is such a way that the deactivation tab 150 is located across or over the opening strip 196 (See FIG. 3, for example). The substrate 160 may be a polyester substrate, a print screen paper, or similar material upon which a circuit may be affixed or formed and supported. The mold layer 170 may be optional and may completely encapsulate the antenna circuit 101 or partially encapsulate the antenna circuit 101 such that a portion of the antenna circuit 101 is exposed. Exposing a portion of the antenna circuit 101 may aid in activation or deactivation.

Figure 3:
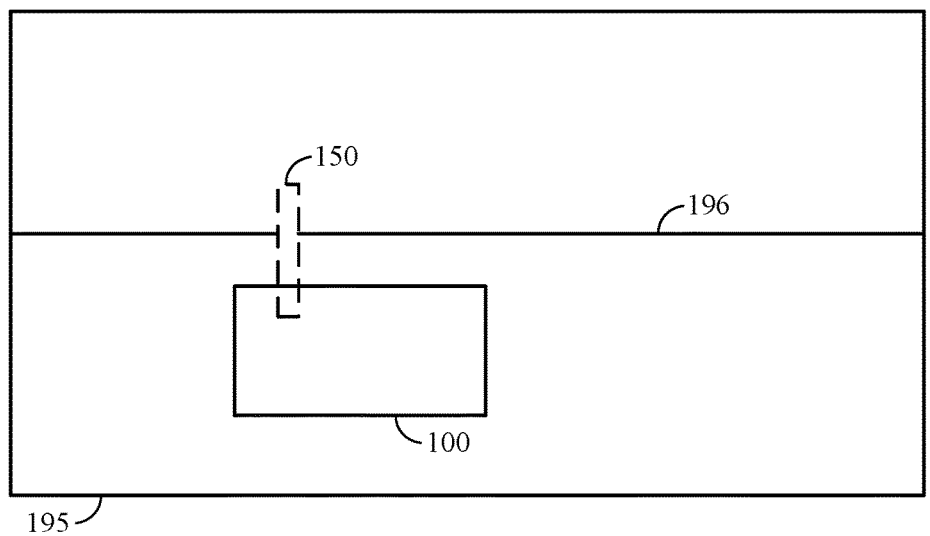
FIG. 3 illustrates a top down view of an exemplary package tracking label affixed to a package in accordance with some examples of the disclosure.

FIG. 3 illustrates a top down view of an exemplary package tracking label affixed to a package in accordance with some examples of the disclosure. As shown in FIG. 3, a package tracking label 100 may be affixed to a package 195 (e.g., a letter, a pouch, a box, or similar container) such that the deactivation tab 150 is across or covers at least a portion of the opening strip 196 of the package 195. The opening strip 196 may be, for example, the flap of an envelope, the line of a box where the two top flaps meet, etc. The opening strip 196 is ideally a location on the package 195 that must be opened to access or view the contents of the package 195 such that opening the package 195 would tear or remove the deactivation tab 150 from the package tracking label 100.

Figure 4:
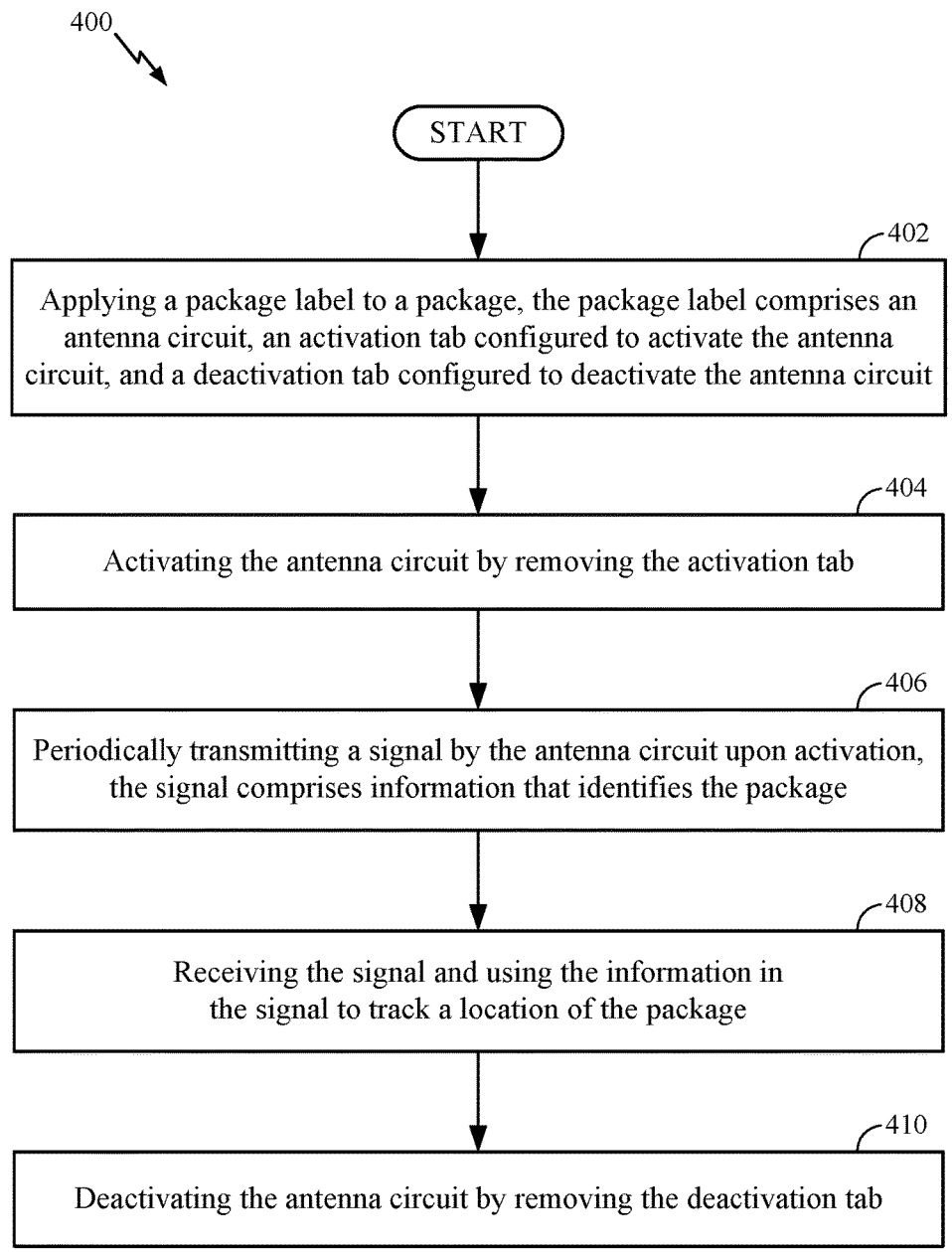
FIG. 4 illustrates an exemplary partial process for tracking a package in accordance with some examples of the disclosure.

FIG. 4 illustrates an exemplary partial process for tracking a package in accordance with some examples of the disclosure. As shown in FIG. 4, a partial process of tracking a package 400 begins in block 402 with applying a package label to a package. The package label (e.g., package tracking label 100 and package tracking label 500) may comprise an antenna circuit (e.g., antenna circuit 101), an activation tab (e.g., activation tab 140 and activation tab 540) configured to activate the antenna circuit, and a deactivation tab (e.g., deactivation tab 150 and deactivation tab 550) configured to deactivate the antenna circuit. The partial process 400 continues in block 404 with activating the antenna circuit by removing the activation tab. The partial process 400 continues in block 406 with periodically transmitting a signal by the antenna circuit upon activation, the signal comprises information that identifies the package. The partial process 400 continues in block 408 with receiving the signal and using the information in the signal to track a location of the package. The partial process 400 continues in block 410 with deactivating the antenna circuit by removing the deactivation tab. The deactivation of the antenna circuit may occur when the package is opened signaling delivery of the package. In addition, the signal may be a Bluetooth Low Energy signal. The partial process 400 may use the package tracking label 100 described above.

Figure 5A:
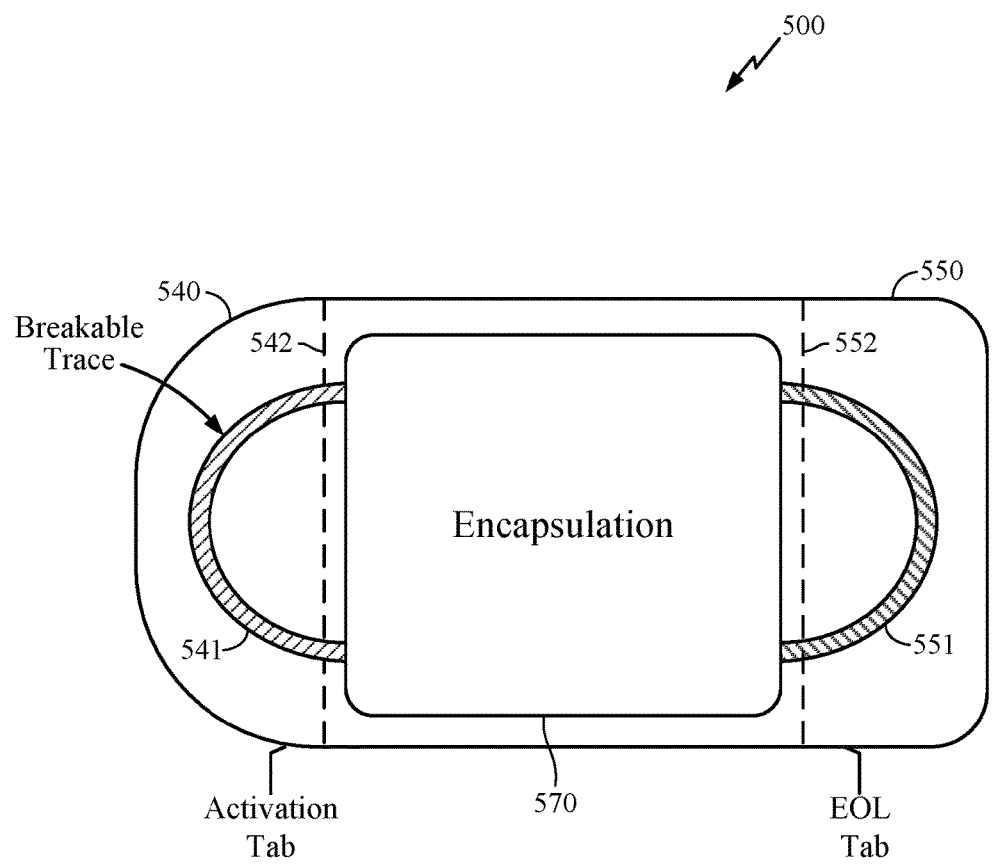
FIG. 5A illustrates a top down view of an exemplary package tracking label before activation in accordance with some examples of the disclosure.

FIG. 5A illustrates a top down view of an exemplary package tracking label before activation in accordance with some examples of the disclosure. As shown in FIG. 5A, a package tracking label 500 may include an antenna circuit (not shown but see antenna circuit 101 in FIG. 1, for example). The package tracking label 500 may also include an activation tab 540 (e.g., activation tab 140), an activation trace 541 connected to the activation tab 540 and the antenna circuit, a first perforation strip 542 connecting the activation tab 540 to the package tracking label 500, a deactivation tab 550 (e.g., deactivation tab 150), a deactivation trace 551 connected to the deactivation tab 550 and the antenna circuit, a second perforation strip 552 connecting the deactivation tab 550 to the package tracking label 500, and an encapsulation layer 570 (e.g., mold layer 170) that encapsulates the antenna circuit to protect the antenna circuit components. The activation tab 540 is configured to activate the antenna circuit when removed by breaking the activation trace 541 (See FIG. 5B). The removal of the activation tab 540 may occur by manually removing the activation tab 540 that tears the activation trace 541 along the first perforation strip 542. The activation trace 541 may be connected to a ground from a first GPIO pin (not shown) of a microprocessor (e.g., microprocessor 120). The first GPIO pin may include a first pull-up resistor (not shown) on the first GPIO pin such that when the activation tab 540 is present, a voltage on the first GPIO pin is at a low voltage. When the activation trace 541 is broken, it will remove the ground connection on the first GPIO pin so that the first pull-up resistor will cause the first GPIO pin to go to a high voltage. This will be detected by the microprocessor and turn on the microprocessor to start transmitting. The deactivation tab 550 is configured to deactivate the antenna circuit when removed by breaking the deactivation trace 551. The removal of the deactivation tab 550 may occur by manually removing the deactivation tab 550 that tears the deactivation trace 551 along the second perforation strip 552. The deactivation trace 551 may be connected to a ground from a second GPIO pin (not shown) of the microprocessor. The second GPIO pin may include a second pull-up resistor (not shown) on the second GPIO pin such that when the deactivation tab 550 is present, a voltage on the second GPIO pin is at a low voltage. When the deactivation trace 551 is broken, it will remove the ground connection on the second GPIO pin so that the second pull-up resistor will cause the second GPIO pin to go to a high voltage. When the deactivation tab 550 is removed and the second GPIO pin goes to a high voltage, the microprocessor may then switch to an end of life mode where it may power down or makes different information available.

Figure 5B:
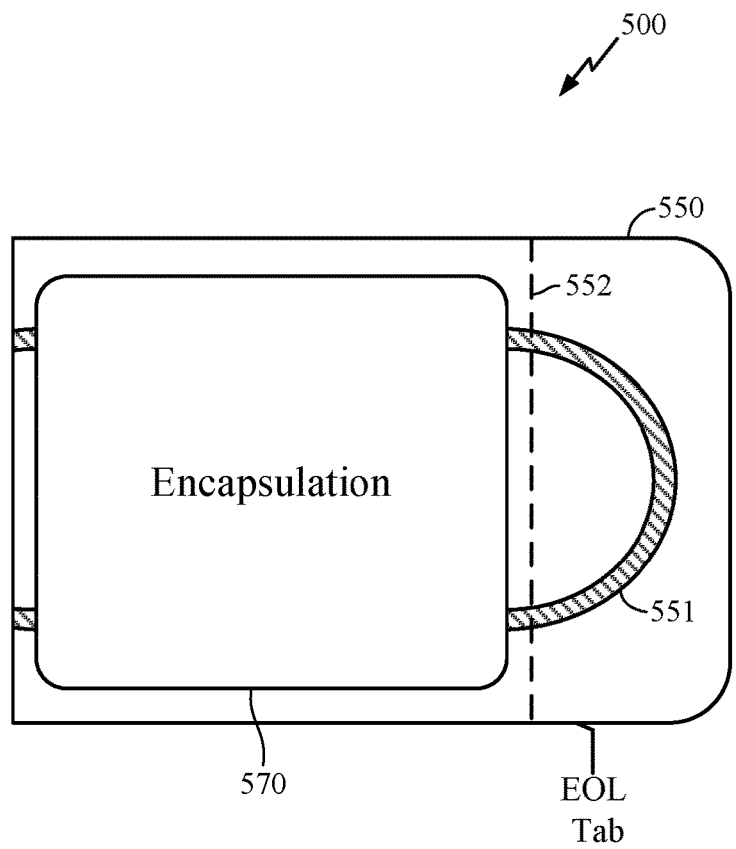
FIG. 5B illustrates a top down view of an exemplary package tracking label after an activation tab is removed in accordance with some examples of the disclosure.

FIG. 5B illustrates a top down view of an exemplary package tracking label after an activation tab is removed in accordance with some examples of the disclosure. As shown in FIG. 5B, the package tracking label 500 is shown after the activation tab 540 is removed leaving the deactivation tab 550 attached to the package tracking label 500 along the second perforation strip 552 with the deactivation trace 551 still intact.

Figure 5C:
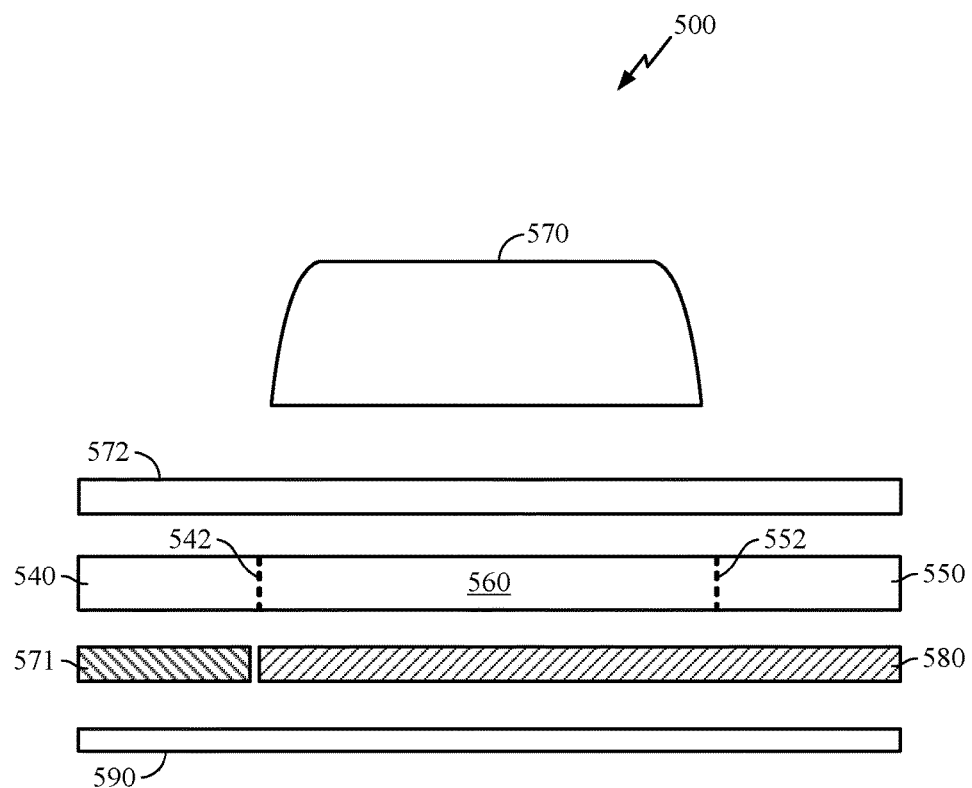
FIG. 5C illustrates an exploded side view of an exemplary package tracking label in accordance with some examples of the disclosure.

FIG. 5C illustrates an exploded side view of an exemplary package tracking label in accordance with some examples of the disclosure. As shown in FIG. 5C, a package tracking label 500 may include an encapsulation layer 570 (e.g., mold layer 170), a cover layer 572, an activation tab 540, a first perforation strip 542, a flex board 560 (e.g., substrate 160), a deactivation tab 550, a second perforation strip 552, a first adhesive layer 571, a second adhesive layer 580 (e.g., adhesive layer 180), and a backer 590 (e.g., removable cover 190). The cover layer 572 may be optional and may be configured to partially detach when the activation tab 540 is removed, such as along the same line as the first perforation strip 542, and partially detach when the deactivation tab 550 is removed, such as along the same line as the second perforation strip 552. The first adhesive layer 571 may be configured to attach the activation tab 540 to the backer 590 such that when the backer 590 is removed, the activation tab 540 is detached along the first perforation strip 542 (along with a portion of the cover layer 572 if present). The backer 590 may be plastic or similar material. While not shown, the package tracking label 500 may include an antenna circuit (e.g., antenna circuit 101 of FIG. 1) on the flex board 560, an activation trace (e.g., activation trace 541 of FIG. 5A) on the activation tab 540, and a deactivation trace (e.g., deactivation trace 551).

It will be appreciated that various aspects disclosed herein can be described as functional equivalents to the structures, materials and/or devices described and/or recognized by those skilled in the art. For example, in one aspect, a package tracking label (e.g., package tracking label 100 in FIGS. 1-3 and package tracking label 500 in FIGS. 5A-C) may comprise an adhesive layer (e.g., adhesive layer 180 in FIG. 2 and the second adhesive layer 580 in FIG. 5C); a removable cover (e.g., removable cover 190 in FIG. 2 and backer 590 in FIG. 5C) on a first side of the adhesive layer; a substrate (e.g., substrate 160 in FIG. 2 and flex board 560 in FIG. 5C) on a second side of the adhesive layer opposite the first side of the adhesive layer; means for transmitting a signal (e.g., antenna circuit 101 in FIG. 1) on the substrate; a mold layer (e.g., mold layer 170 in FIG. 2 and encapsulation layer 570 in FIG. 5C) on the substrate configured to encapsulate the means for transmitting the signal; means for activation (e.g., activation tab 140 in FIGS. 1 and 2 and activation tab 540 in FIGS. 5A and 5C) on the mold layer configured to activate the means for transmitting the signal upon removal; and means for deactivation (e.g., deactivation tab 150 in FIGS. 1-3 and deactivation tab 550 in FIGS. 5A-5C) on the mold layer configured to deactivate the means for transmitting the signal upon removal. It will be appreciated that the aforementioned aspects are merely provided as examples and the various aspects claimed are not limited to the specific references and/or illustrations cited as examples.

One or more of the components, processes, features, and/or functions illustrated in FIGS. 1-5C may be rearranged and/or combined into a single component, process, feature or function or incorporated in several components, processes, or functions. Additional elements, components, processes, and/or functions may also be added without departing from the disclosure. It should also be noted that FIGS. 1-5C and its corresponding description in the present disclosure is not limited to dies and/or ICs. In some implementations, FIGS. 1-5C and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A package tracking label, comprising:
   an adhesive layer;
   a removable cover on a first side of the adhesive layer;
   a substrate on a second side of the adhesive layer opposite the first side of the adhesive layer;
   an antenna circuit on the substrate;
   a mold layer on the substrate configured to encapsulate the antenna circuit;
   an activation tab on the substrate configured to activate the antenna circuit upon removal; and
   a deactivation tab on the substrate configured to deactivate the antenna circuit upon removal.

2. The package tracking label of claim 1, wherein the activation tab is connected to the removable cover and configured to be removed with the removal of the removable cover.

3. The package tracking label of claim 1, wherein the antenna circuit is a Bluetooth Low Energy antenna circuit.

4. The package tracking label of claim 1, wherein the antenna circuit comprises a battery, a microprocessor coupled to the battery, and an antenna coupled to the microprocessor.

5. The package tracking label of claim 4, wherein the activation tab is configured to activate a first general purpose input output pin of the microprocessor that enables activation of the microprocessor.

6. The package tracking label of claim 5, wherein the deactivation tab is configured to activate a second general purpose input output pin of the microprocessor that enables deactivation of the microprocessor.

7. The package tracking label of claim 6, wherein the microprocessor is a Bluetooth Low Energy microprocessor configured to control operation of the antenna.

8. The package tracking label of claim 1, wherein the substrate is one of a polyester substrate or a printed screen paper.

9. The package tracking label of claim 1, wherein the deactivation tab is configured to be applied to a package such that the package cannot be opened without removal or breakage of the deactivation tab.

10. A package tracking label, comprising:
    an adhesive layer;
    a removable cover on a first side of the adhesive layer;
    a substrate on a second side of the adhesive layer opposite the first side of the adhesive layer;
    means for transmitting a signal on the substrate;
    a mold layer on the substrate configured to encapsulate the means for transmitting the signal;
    means for activation on the substrate configured to activate the means for transmitting the signal upon removal; and
    means for deactivation on the substrate configured to deactivate the means for transmitting the signal upon removal.

11. The package tracking label of claim 10, wherein the means for activation is connected to the removable cover and configured to be removed with the removal of the removable cover.

12. The package tracking label of claim 10, wherein the means for transmitting the signal is a Bluetooth Low Energy antenna circuit.

13. The package tracking label of claim 10, wherein the means for transmitting the signal comprises a battery, a microprocessor coupled to the battery, and an antenna coupled to the microprocessor.

14. The package tracking label of claim 13, wherein the means for activation is configured to activate a first general purpose input output pin of the microprocessor that enables activation of the microprocessor.

15. The package tracking label of claim 14, wherein the means for deactivation is configured to activate a second general purpose input output pin of the microprocessor that enables deactivation of the microprocessor.

16. The package tracking label of claim 15, wherein the microprocessor is a Bluetooth Low Energy microprocessor configured to control operation of the antenna.

17. The package tracking label of claim 10, wherein the substrate is one of a polyester substrate or a printed screen paper.

18. A method of tracking a package, comprising:
applying a package label to a package, the package label comprises an antenna circuit, an activation tab configured to activate the antenna circuit, and a deactivation tab configured to deactivate the antenna circuit;
activating the antenna circuit by removing the activation tab;
periodically transmitting a signal by the antenna circuit upon activation, the signal comprises information that identifies the package; and
receiving the signal and using the information in the signal to track a location of the package.

19. The method of claim 18, further comprising deactivating the antenna circuit by removing the deactivation tab.

20. The method of claim 18, wherein the signal is a Bluetooth Low Energy signal.

21. The method of claim 18, wherein the activation tab is connected to a removable cover and configured to be removed with the removal of the removable cover.

22. The method of claim 18, wherein the antenna circuit comprises a battery, a microprocessor coupled to the battery, and an antenna coupled to the microprocessor.

23. The method of claim 18, wherein the activation tab is configured to activate a first general purpose input output pin of a microprocessor that enables activation of the microprocessor.

24. The method of claim 18, wherein the deactivation tab is configured to activate a second general purpose input output pin of a microprocessor that enables deactivation of the microprocessor.

25. The method of claim 18, wherein the deactivation tab is configured to be applied to a package such that the package cannot be opened without removal or breakage of the deactivation tab.

26. A non-transitory computer-readable medium comprising instructions that when executed by a processor cause the processor to perform a method comprising:
activating an antenna circuit when an activation tab configured to activate the antenna circuit is removed;
periodically transmitting a signal by the antenna circuit upon activation, the signal comprises information that identifies a package;
receiving the signal and using the information in the signal to track a location of the package; and
deactivating the antenna circuit when a deactivation tab configured to deactivate the antenna circuit is removed.

27. The non-transitory computer-readable medium of claim 26, wherein the signal is a Bluetooth Low Energy signal.

28. The non-transitory computer-readable medium of claim 26, wherein the activation tab is configured to activate a first general purpose input output pin of the processor that enables activation of the processor.

* * * * *